T. R. CORMICK.
Wheel Cultivator.

No. 39,276 — Patented July 21, 1863.

Witnesses:

Inventor:
T R Cormick

UNITED STATES PATENT OFFICE.

TULLY R. CORNICK, OF CAP-AU-GRIS, MISSOURI.

IMPROVED CULTIVATOR.

Specification forming part of Letters Patent No. 39,276, dated July 21, 1863.

*To all whom it may concern:*

Be it known that I, TULLY R. CORNICK, of Cap-au-Gris, in the county of Lincoln and State of Missouri, have invented certain new and useful Improvements in Cultivators; and I do hereby declare the following to be a full and exact description of the same, reference being had to the accompanying drawings, making part of this specification, in which—

Figure 1:
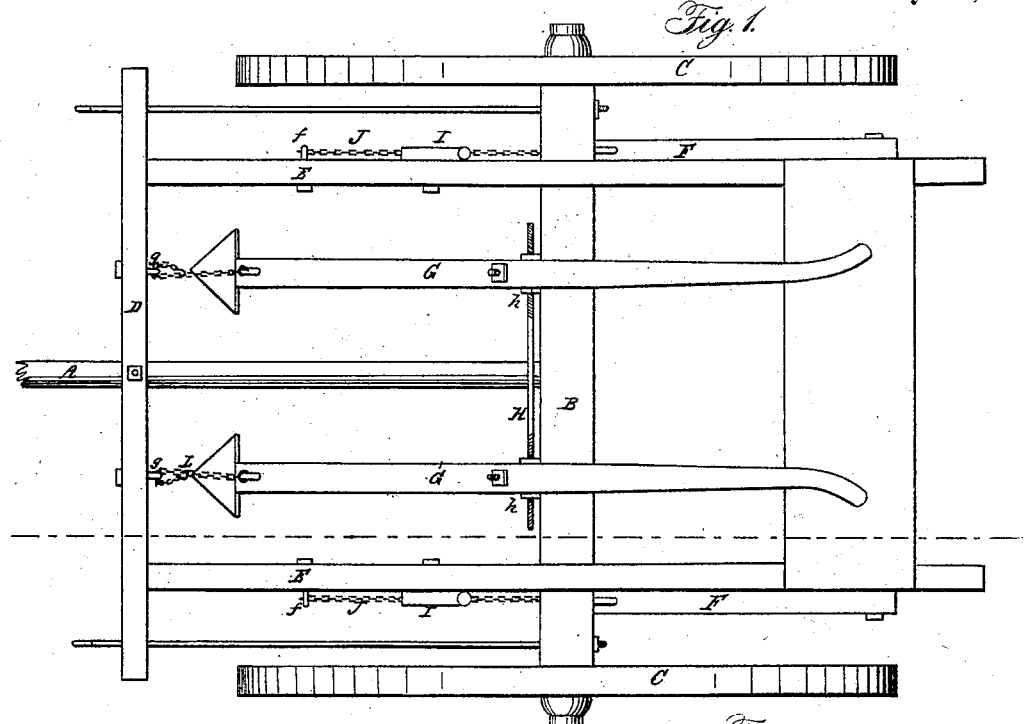
Figure 2:
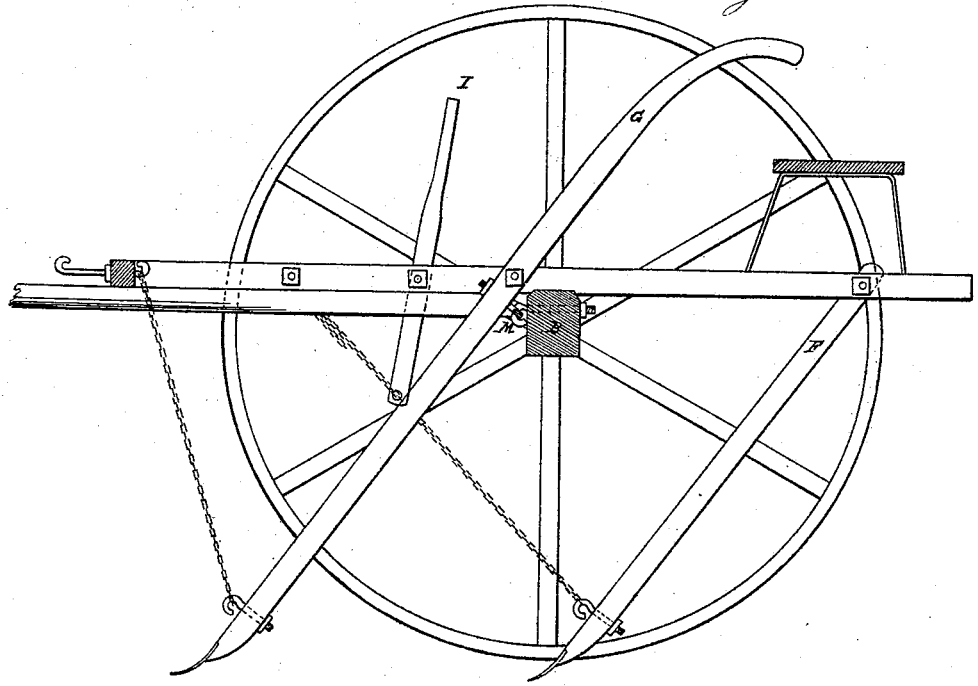

Figure 1 is a plan of my improved implement. Fig. 2 is a vertical longitudinal section of the same at *x x*.

Similar letters of reference indicate corresponding parts in both views.

The subject of the said invention is an implement of simple and cheap construction supported on two wheels, and provided with plow or cultivator shanks pivoted to the frame and braced by drag-chains in such a manner that they may be readily regulated in depth and pitch and independently raised or adjusted as occasion may require.

The improvements particularly consist, first, in the use of a pair of cultivator or plow shanks connected to the axle or other part of the frame by universal joints, and otherwise mounted and applied, substantially as hereinafter described, so as to permit their independent or simultaneous adjustment vertically or laterally; second, in the combination of pivoted shanks, draft-chains, and raising-levers, as hereinafter described.

In order that others skilled in the art to which my invention appertains may be enabled to fully understand and use the same, I will proceed to describe its construction and operation.

A cart-tongue, A, is permanently fixed to an axle, B, to which axle is attached a pair of wheels, C C, such as are used on a farm-cart or at the fore or hind wheels of a farm-wagon; but the higher the wheels the more practicable will it be found to use the implement in the cultivation of a growing crop in its last stages of growth. A cross-piece, D, is bolted onto the tongue in front of and parallel with the axle, and two pieces, E E, are fastened by bolts and nuts, one end of each to the cross-piece D, and two inches (more or less) beyond the longitudinal centers of each, by screws and nuts, to the axle B, and at equal distances from the lengthwise center of the axle. The said two pieces E E being thus fixed in lines parallel with one another, their proper distance from one another will depend on the distances at which the crop to be cultivated has been planted.

Two helves, F F, are fastened to the hinder ends of the two pieces E E by bolts and nuts. Two long helves, G G, are fastened to the front part of the axle B, at equal distances from the longitudinal center thereof, by means of double eyebolts working in one another, of which bolts two are secured to the axle by nuts, and the others are secured one to each helve in the same way, the whole constituting a universal joint. The said long helves are coupled together by means of an iron rod, H, on each end of which a screw-thread has been cut. The said rod H is provided with four nuts, one on each side of each of said long helves G G, each of which nuts is screwed up in such a manner as to leave a small vacancy between it and the helve nearest to it—say about one-eighth to one-fourth of an inch. Said rod H works through each of the long helves either in an auger-hole a little larger than the rod or in an elongated mortise. By means of the nuts on the rod H the distance between the plows on the ends of the helves G G can be regulated to suit the space occupied by the row of corn, cotton, &c., to be cultivated. Said plows will, when thus regulated, run in the line of direction desired if the row of corn, cotton, &c., is straight, and shall require no attention from the plowman to avoid plowing up those plants out of line; but if the plants vary from a straight line the large auger-holes or mortises in which the rod H works allow the plowman to shy either one or both of said plows around the plants out of line, plowing close up to them, and with greater facility than that with which a common one-horse implement can be shied around the same plants. The long helves G G terminate at the upper ends in handles, which flare in such manner as to suit the hands of the plowman.

Plows are attached to the helves F F and G G of any of the known forms—such as shovel-plows, bull-tongues, carys, diamonds, bar-shares, &c.—of such character and size as required by the kind of work to be done and by the peculiarities of the soil and its then condition.

The proper position of each helve while the implement is in operation is secured by means of a chain attached to that part of the helve immediately above the plow by an eyebolt, and the other end of the chain passes through the eye of the eyebolts $f f g g$, and is hooked back in one of its own links, so as to give a greater facility for varying the depth at which the plow is to be set.

The levers I I are tied at their lower ends to the chains J J and secured to the pieces E E by means of screw-bolts working loosely therein. By means of the levers I I the plowman can, when necessary, raise out of the ground the plows attached to the helves F F.

A seat, K, is fixed on the hinder part of the implement, on which the plowman rides while operating it.

In cultivating the growing crop the team, then consisting of two horses or mules, must be driven one on each side of the row of corn, cotton, &c. If the condition of the ground and character of the season be such as to make it proper to cultivate the growing crop with turning-plows instead of stirring-plows, then two left-hand and two right-hand turning-plows must be substituted for the stirring-plows with those of the same kind on the left-hand side or right-hand side of the row to be cultivated, according as it is most proper to throw the dirt to the plants or from them.

The implement, with a center helve and plow inserted, can be advantageously used for the covering in of small grain, and with much greater economy of time and seed than a harrow, because every grain is covered the first time going over. As a small grain-coverer, it is, when the ground is foul with a growth of young weeds, superior to the drill, because it will, without any previous harrowing, cover in every grain and in the act of doing so put the ground in good tilth.

The leading advantages of this implement are its great simplicity and cheapness and the freedom of horizontal and vertical adjustment afforded to the plows next the corn.

Having thus described my invention, what I claim as new therein, and desire to secure by Letters Patent, is—

1. The combination of the plow-shanks and handles G G, draft-chains L L, universal joints M, connecting-rod H, and adjusting-nuts $h$, constructed, arranged, and operating substantially as and for the purposes set forth.

2. The combination of the elevating-levers I I, draft-chains J J, and hinged plow-shanks F F, constructed, arranged, and operating substantially as and for the purposes specified.

TULLY R. CORNICK.

Witnesses:
CHARLES SMITH,
T. SCHEITHIN.